(12) United States Patent
Westerinen et al.

(10) Patent No.: US 7,689,625 B2
(45) Date of Patent: Mar. 30, 2010

(54) TAXONOMY OBJECT MODELING

(75) Inventors: Andrea Rose Westerinen, Issaquah, WA (US); Nigel Graham Cain, Redmond, WA (US); Bahadir Baris Onalan, Bellevue, WA (US); Adam Joseph Herscher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 11/621,961

(22) Filed: Jan. 10, 2007

(65) Prior Publication Data

US 2008/0168083 A1 Jul. 10, 2008

(51) Int. Cl.
G06F 7/00 (2006.01)
G06F 17/30 (2006.01)

(52) U.S. Cl. ...................... 707/778; 707/797
(58) Field of Classification Search .............. None
See application file for complete search history.

(56) References Cited

U.S. PATENT DOCUMENTS

| | | | |
|---|---|---|---|
| 6,073,175 A | 6/2000 | Tavs et al. | |
| 6,571,253 B1 | 5/2003 | Thompson et al. | |
| 6,675,355 B1 | 1/2004 | Demopoulos | |
| 6,711,585 B1 * | 3/2004 | Copperman et al. | 707/104.1 |
| 6,847,970 B2 | 1/2005 | Keller et al. | |
| 6,898,604 B1 | 5/2005 | Ballinger et al. | |
| 6,973,460 B1 | 12/2005 | Mitra | |
| 7,076,728 B2 | 7/2006 | Davis et al. | |
| 7,089,246 B1 | 8/2006 | O'Laughlen | |
| 7,134,072 B1 | 11/2006 | Lovett | |
| 7,181,438 B1 * | 2/2007 | Szabo | 707/2 |
| 7,266,548 B2 * | 9/2007 | Weare | 707/3 |
| 7,617,160 B1 * | 11/2009 | Grove et al. | 705/500 |
| 2001/0047372 A1 | 11/2001 | Gorelik et al. | |
| 2002/0104070 A1 | 8/2002 | Adams | |
| 2002/0188644 A1 | 12/2002 | Seidman | |

(Continued)

FOREIGN PATENT DOCUMENTS

JP 2006243929 A 9/2006

OTHER PUBLICATIONS

Goff et al., "Object Serialization and Decimalization using XML," Apr. 2001, CERN, Switzerland, pp. 1-14.

(Continued)

Primary Examiner—Mohammad Ali
Assistant Examiner—Patrick A Darno
(74) Attorney, Agent, or Firm—Senniger Powers LLP

(57) ABSTRACT

A computer-readable storage medium having a data structure for representing a plurality of objects. The data structure includes a first data field storing data associated with a taxonomy type. The data structure also includes a second data field storing data associated with a reference to a model instance of an object classified by the taxonomy type. The model instance identifies an entity represented by the classified object. A third data field stores a first data set having data stored in the second data field. The first data set identifies a set of one or more objects related to the classified object positioned higher in a hierarchical structure than the classified object. A fourth data field stores a second data set having data stored in the second data field. The second data set identifies a set of one or more objects related to the classified object positioned lower than classified object.

15 Claims, 8 Drawing Sheets

U.S. PATENT DOCUMENTS

| | | | |
|---|---|---|---|
| 2003/0053106 A1 | 3/2003 | Kuroda et al. | |
| 2004/0083453 A1 | 4/2004 | Knight et al. | |
| 2004/0148367 A1 | 7/2004 | Takano et al. | |
| 2004/0230572 A1* | 11/2004 | Omoigui | 707/3 |
| 2004/0261018 A1 | 12/2004 | Dunne | |
| 2004/0267718 A1* | 12/2004 | Milligan et al. | 707/3 |
| 2005/0097084 A1 | 5/2005 | Balmin et al. | |
| 2005/0149908 A1 | 7/2005 | Klianev | |
| 2005/0278310 A1* | 12/2005 | Abrams et al. | 707/3 |
| 2005/0278353 A1 | 12/2005 | Norgaard et al. | |
| 2006/0010369 A1 | 1/2006 | Naundorf et al. | |
| 2006/0053151 A1* | 3/2006 | Gardner et al. | 707/102 |
| 2006/0064667 A1 | 3/2006 | Freitas | |
| 2007/0011193 A1* | 1/2007 | Coker | 707/103 R |
| 2007/0027861 A1* | 2/2007 | Huentelman et al. | 707/5 |
| 2007/0055680 A1* | 3/2007 | Statchuk | 707/100 |

OTHER PUBLICATIONS

ISO/IEC, "Document Schema Definition Languages (DSDL)—Part 4: Namespace-based Validation Dispatching Language—NVDL," May 2004, available at http://dsdl.org, pp. i-vi, 1-45.

Bowers, Shawn, A Generic Approach for Representing Model-Based Superimposed Information http://www.ogi.edu/csee/tech-reports/2000/00-008.pdf, May 1, 2000, 29 pages, Oregon Graduate Institute, Research Proficiency Exam, US.

Boukottaya, A. et al, Automating XML documents Transformations: A conceptual modelling based approach http://wam.inrialpes.fr/people/roisin/mw2004/Boukottaya.pdf, 2004, 10 pages, Australian Computer Society, Inc. Darlinghurst, Australia, Australia.

International Search Report and Written Opinion, International Application No. PCT/US2008/057746, dated Aug. 21, 2008, 11 pages.

International Search Report and Written Opinion, Application No. PCT/US2008/051721, dated Jun. 20, 2008.

* cited by examiner

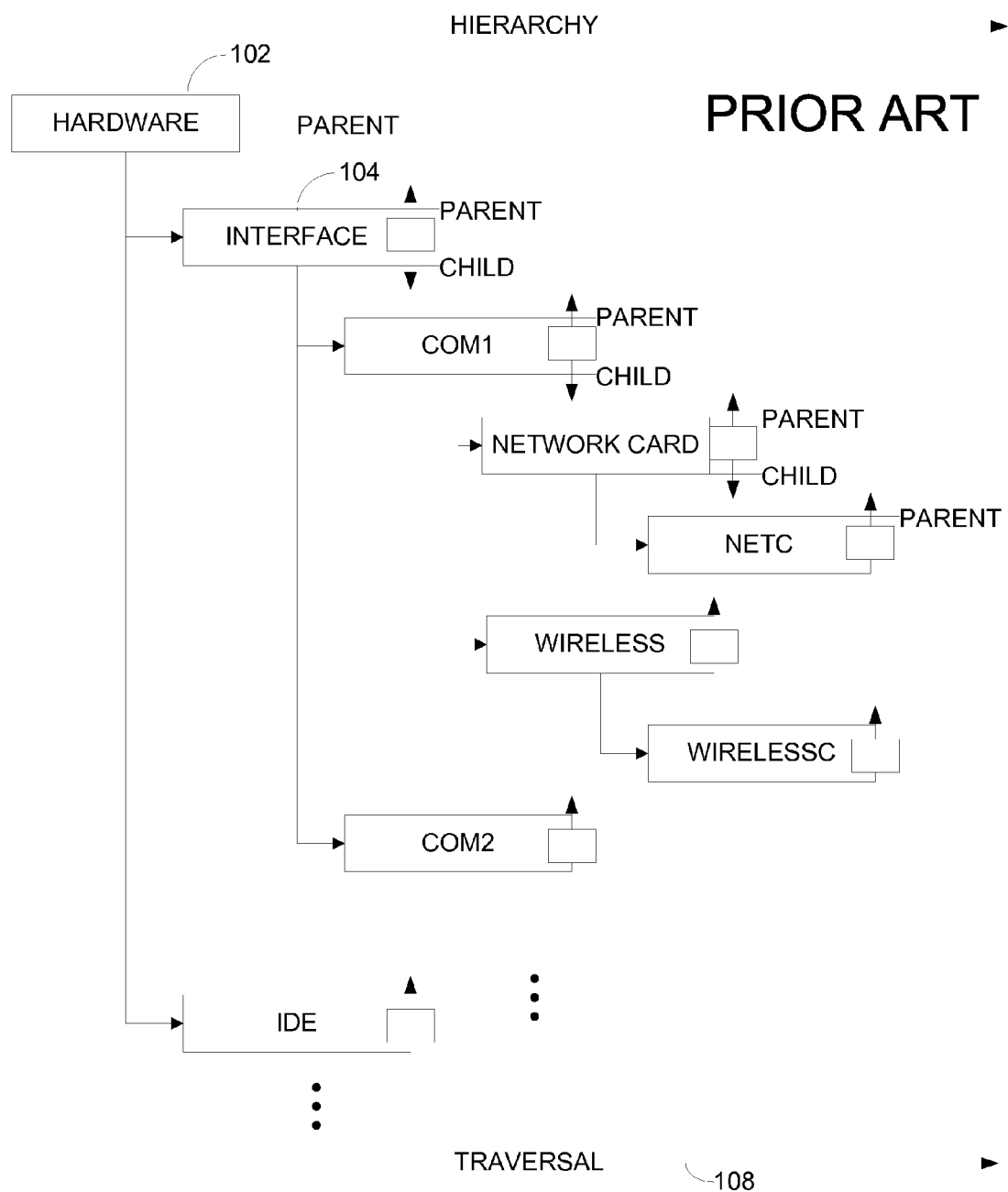

TAXONOMY OBJECT MODELING

BACKGROUND

Data hierarchy schemes, such as tree structures, are important tools for representing, organizing, and retrieving data. The typical scheme starts by establishing definitions that classify the types of data involved. At the same time, each data type may be associated with a reference mechanism (e.g., a pointer, a link, or a physical memory address) that refers to the data represented by the hierarchy scheme. Additionally, the reference mechanisms may negatively impact performance in traversing the hierarchy and in processing query requests.

Current practices rely on the basic tree structure and apply various programming languages to fit its needs. Using FIG. 1 as an illustration, a taxonomy structure 100 is a basic example of organizing hardware data within a device. In this taxonomy structure, a hardware node 102 is classified as a parent node for all other nodes because it is at the top of the hierarchy. The hardware node 102 has one or more children and one of them is an interface node 104. The hardware node 102 thus includes a pointer or a reference referring to its child node, the interface node 104 in this example. The interface node 104 is also a parent to its children nodes. Likewise, the interface node 104 has a pointer referring to its parent, the hardware node 102, and a pointer referring to its children nodes, in this case COM1 and COM2.

In this basic and fundamental existing hierarchy scheme, it is convenient to implement the pointers and establish a relationship based on the pointers. However, one needs to perform a complete traversal of the structure before knowing all of the relationships. Using FIG. 1 as an example, one needs to traverse three levels of the tree structure to the COM1 to know that it is in a lower hierarchical level than the interface node 104. When traversing to the interface node 104, one would only know that there might be a lower level (since it is likely that there is a pointer but it may point to NULL), but it may not know the identity of that lower node until one traverses to the lower level. Traversing the entire structure, generally designated 108, is shown moving from left to right in the tree structure of FIG. 1.

SUMMARY

Embodiments of the invention overcome the shortfalls of existing practices by defining objects according to a taxonomy structure that supports data having references to related objects. Using these references, which contain information about related objects and references to the actual entities represented by these related objects, aspects of the invention establish a robust classification or taxonomy structure. In an alternative embodiment, mechanisms and conventions embodying aspects of the invention use extensible markup language (XML) or unified modeling language (UML).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 1 is a block diagram illustrating an exiting typical representation of a hierarchical structure.

Corresponding reference characters indicate corresponding parts throughout the drawings.

DETAILED DESCRIPTION

Embodiments of the invention provide a standardized and an efficient mechanism for defining hierarchical structures used to represent physical objects, such as a containment taxonomy or terminology trees. For example, the containment taxonomy may represent physical hardware, such as network cards or adapter cards coupled to a chassis of a computing device, located at a data center, or the like. The containment taxonomy may also include references to files (e.g., file structure systems in a computing device), or locations (e.g., data centers or workspaces in buildings in regions). The terminology taxonomy may include defining a status, sub-status, symptom, or the like. In an alternative embodiment, aspects of the invention relate the taxonomy structure to the "real world" data in a single design while maintaining flexibility of the structure and provide efficient traversal, searching, and retrieval.

Figure 2A:
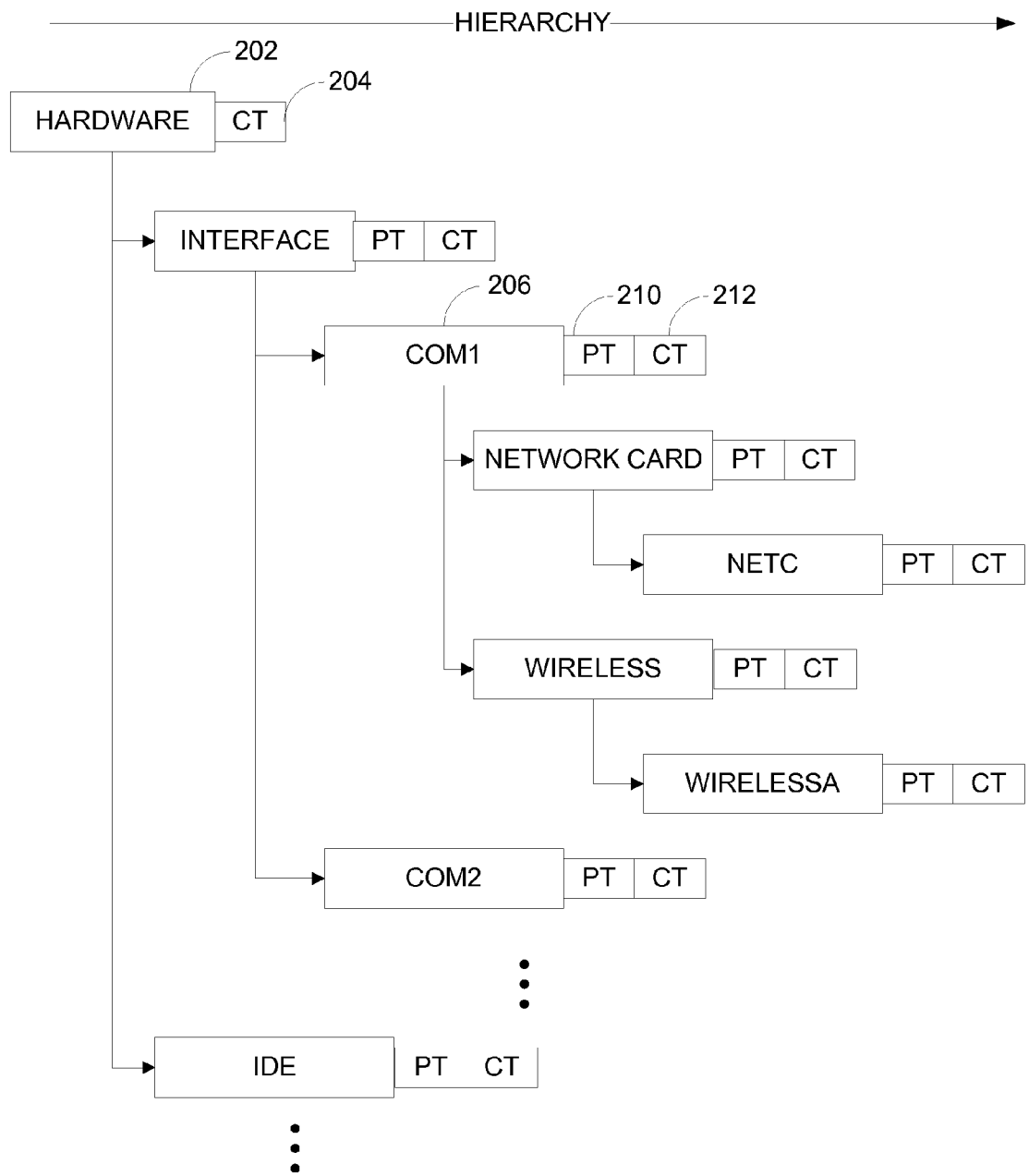
FIGS. 2A and 2B are block diagrams illustrating a basic representation of a taxonomy structure according to an embodiment of the invention.
Figure 2B:
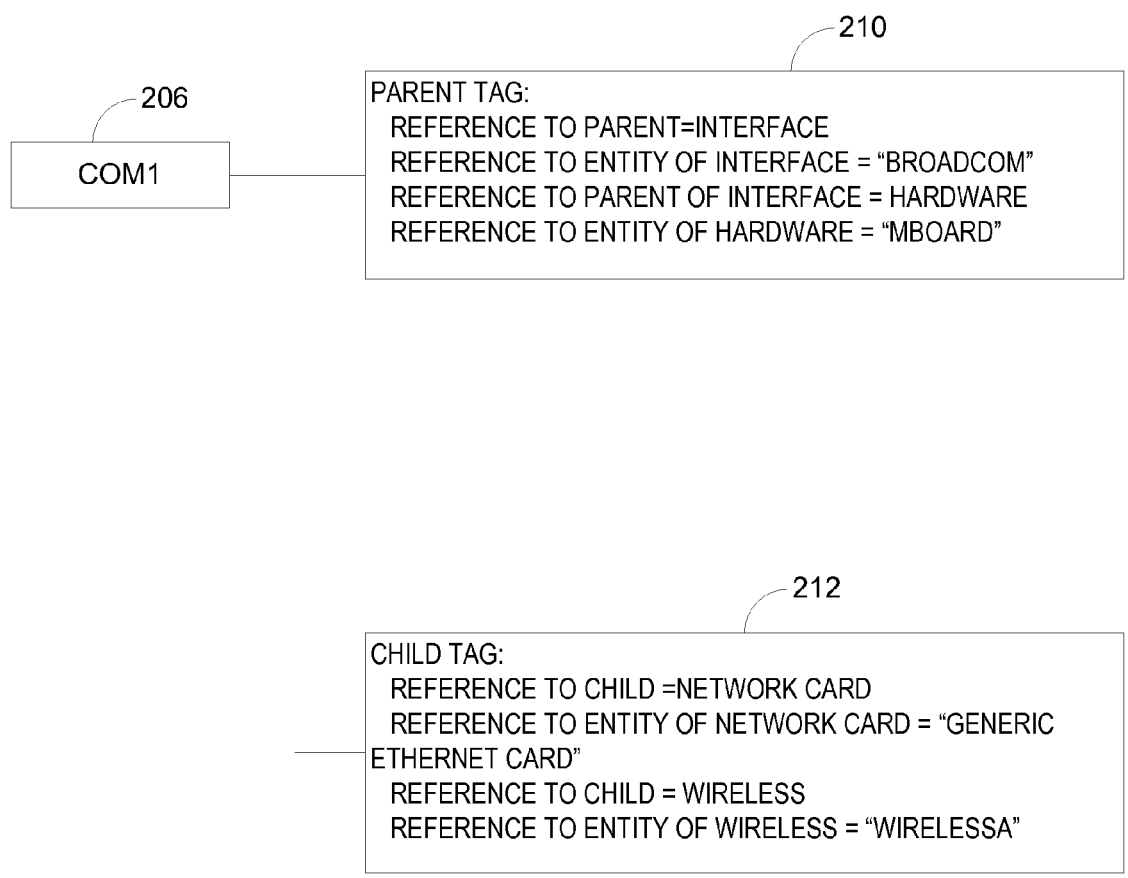

Referring now to FIGS. 2A and 2B, block diagrams illustrate a basic representation 200 of a taxonomy structure according to an embodiment of the invention. In this example, the representation 200 illustrates a containment structure of a hardware chassis setup for a computing system. In one embodiment, a plurality of taxonomy types is defined for this containment structure. For example, the plurality of taxonomy types identifies the classification for identifying entities that the classification represents. For example, the classification may wish to represent a collection of entities in the hardware chassis and taxonomy types assist in better organizing and representing each of the entities. In this relatively straightforward example, the plurality of taxonomy types may include "Hardware," "Interface," "COM1," "Network Card", etc. It is to be understood that other taxonomy types may be defined based on the structure depending on a particular usage without departing from the scope of the invention. It is also understood that other taxonomy types for a terminology taxonomy or other classification may be applied without departing from the scope of the invention.

Referring to FIG. 2A, an object 202 having a taxonomy type "Hardware" identifies a parent for the structure. The object 202 has one or more related objects in this structure. Embodiments of the invention enable the object 202 to include a tag definition 204 identifying the related objects based on the relationship of the other objects in the hierarchical structure. In this example, the tag definition 204 identifies one or more objects that are in a lower hierarchy level than the object 202. Advantageously, a structure embodying aspects of the invention need not assign a pointer referring to each of the objects in lower levels of the object 202 and need not include additional information as shown in FIG. 1.

To further illustrate the taxonomy type according to embodiments of the invention, an object 206 defines another taxonomy type "COM1." This object 206 identifies related objects using definition tags 210 and 212. Referring to FIG. 2B, a block diagram illustrates the details of the related objects of the object in the taxonomy type "COM1" according to embodiments of the invention. For example, the object 206 includes the "parent tag" 210 which includes a first data set identifying a set of one or more objects which is positioned higher (i.e., parent level(s)) in the hierarchical structure. For example, the definition tag "parent tag" 210 shows a list of the parent objects of the object 206. In this instance, the definition tag 210 shows that a taxonomy type "Interface" is the parent of the object 206 or is in a higher position in the hierarchical structure than the object 206. The tag 210 also includes information associated with a parent of the taxonomy type "Interface," which is the object 202, "Hardware." In an alternative embodiment, the list may be an ordered list.

In an alternative embodiment, the first data set also includes one or more data fields for storing information or reference associated with each of the identified taxonomy type. For example, the parent tag 210 includes a reference to or information to an entity represented by the taxonomy type "Interface," which is "Broadcom." In another example, the first data set also includes a reference to or information of an entity represented by the taxonomy type "Hardware," which is "Mboard." In another embodiment, the reference may be a link, a path, or a data value referring to the entity.

Likewise, the definition tag 212 includes a second data set identifying a set of one or more objects which are positioned lower (i.e., child level) in the hierarchical structure. For example, the definition tag 212 shows that the second data set includes a reference to a taxonomy type "Network Card," and a taxonomy type "Wireless." The second data set also includes a reference to an entity represented by the taxonomy type "Network Card," "generic Ethernet card" and a reference to an entity represented by the taxonomy type "Wireless," "WirelessA."

As such, embodiments of the invention define a plurality of taxonomy types and classify an object according to at least one of the taxonomy types based on the relationship of the classified object to one or more other objects related thereto. In yet an alternative embodiment, the taxonomy type of the classified object is associated with a first reference identifying an actual entity represented by the classified object. Using FIG. 2A as an example, the "Hardware" taxonomy type includes the first reference identifying "Mboard" as the actual entity represented by the object 202.

Figure 3A:
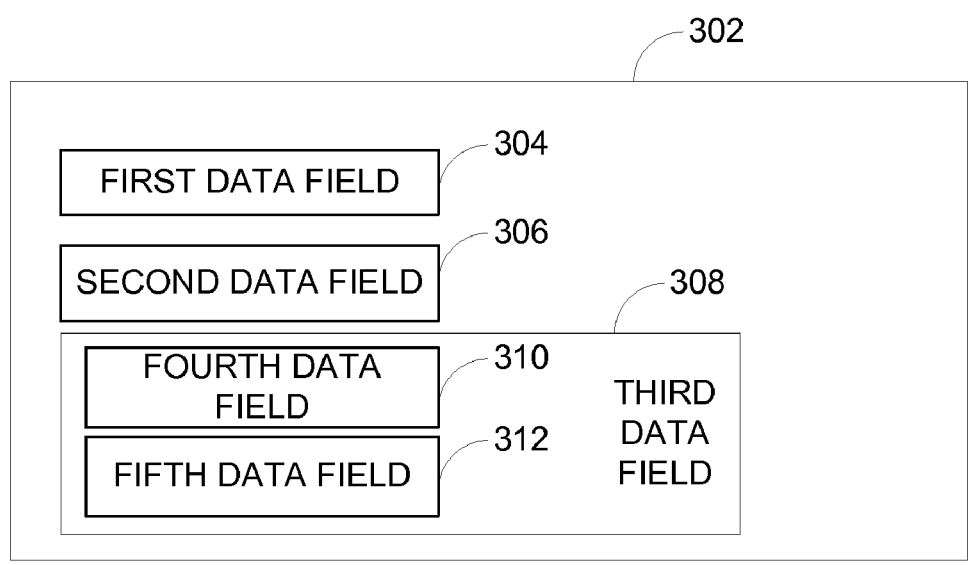
FIGS. 3A and 3B are block diagrams illustrating an exemplary data structure embodying elements of the taxonomy structure according to an embodiment of the invention.

Referring now to FIG. 3A, a block diagram illustrates an exemplary data structure 302 embodying elements of the taxonomy structure according to an embodiment of the invention. The data structure 302 includes a first data field 304 associated with a taxonomy type. For example, the taxonomy type in the first data field 304 may include an interface connection, a network card adapter, or the like for a hardware containment taxonomy. Another taxonomy type may be a status, a sub-status, or the like for a terminology taxonomy. The data structure 302 also includes a second data field 306 being associated with a first reference to a model instance, where the model instance identifies an entity represented by the first reference 306. Also as illustrated in FIG. 3A, the data structure 302 includes a third data field 308 storing a data set having data stored in the second data field 306, and the data set identifies a set of one or more objects relative to the classified object in a hierarchical structure.

In one example, the third data field 308 includes a fourth data field 310 identifying a set of one or more objects related to the classified object positioned higher in the hierarchical structure. In another embodiment, the third data field 308 includes a fifth data field 312 identifying a set of one or more objects related to the classified object positioned lower in the hierarchical structure. In yet another embodiment, the third data field 308 may include one or more objects related to the classified object positioned in the same level in the hierarchical structure. It is to be understood that the naming of the first data field 304, the second data field 306, the third data field 308, the fourth data field 310, and the fifth data field 312 is for illustration purposes only and does not restrict or limit the ordering of these data fields in the data structure 302.

Figure 3B:
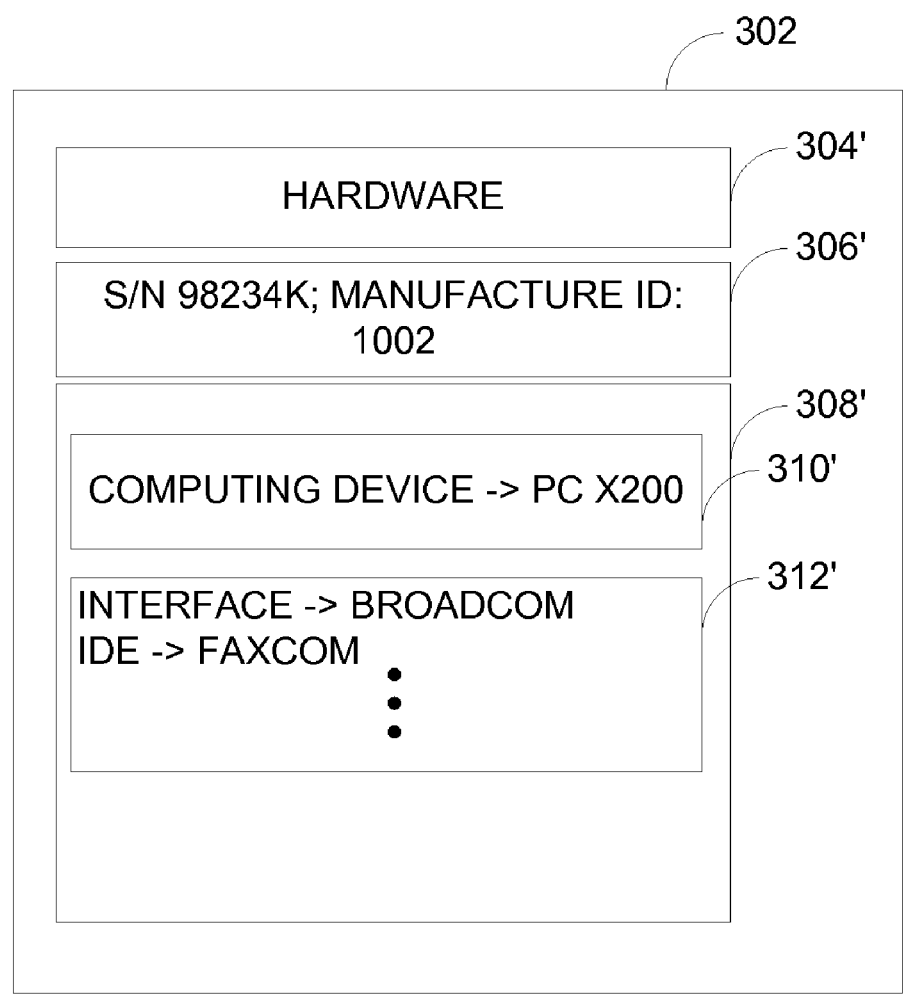

Using FIGS. 2A and 3A as examples, FIG. 3B is a diagram illustrating one implementation of the invention described in FIGS. 2A and 3A. For example, using the taxonomy type 202 as an illustration, the first data field 304' shows the taxonomy type "Hardware." The second data field 306 is associated with a first reference to an entity represented by the taxonomy type identified in the first data field 304'. In this example, the second data field 306' shows "S/N 98234k; manufacture id: 1002," which identifies a physical instance of a hardware entity represented by the "Hardware" taxonomy type. The third data field 308' identifies a set of one or more objects relative to the classified object (e.g., "Hardware") in the hierarchical structure. For example, the fourth data field 310' includes one or more objects related to the classified object positioned higher in the hierarchical structure than the classified object. In this instance, the fourth data field 310' in FIG. 3B identifies the parent object (i.e., one or more objects positioned higher in the hierarchy than the "Hardware"), "Computing device," and identifies the entity, "PC x200," represented by the "Computing device." Similarly, the fifth data field 312' identifies the children objects (i.e., one or more objects positioned lower in the hierarchy than "Hardware"), "Interface" and "IDE," and identifies the entities "Broadcom" and "Faxcom," represented by the children objects. In another embodiment, the third data field 308 may include one or more related objects positioned in the same level as the classified object in the hierarchical structure.

By so doing, each of the taxonomy types includes rich information associated with the related objects in the hierarchical structure such that a user may obtain information about the structure in one instance. In one example, embodiments of the invention instantiate or create a single instance of the taxonomy type of the classified object including the information of the classified object and the information represented in the first data set and the second data set. In one alternative embodiment, XML schema types may be defined as described below:

```
<xs:element name="OrganizationalContainmentTaxonomy"
type="core:ContainmentTaxonomyType">
    <xs:annotation>
        <xs:documentation>A containment taxonomy defining
organizational parent/child (container/containing) references for an
instance of OrganizationalEntity.</xs:documentation>
    </xs:annotation>
</xs:element>
<xs:element name="OrganizationalContainmentTaxonomyRef" />
Similar definition for LocationContainmentTaxonomy
<xs:element name="WorkItemStatusTerminology"
type="core:TerminologyTaxonomyType"/>
<xs:element name="WorkItemStatusTerminologyRef"/>
```

Figure 4:
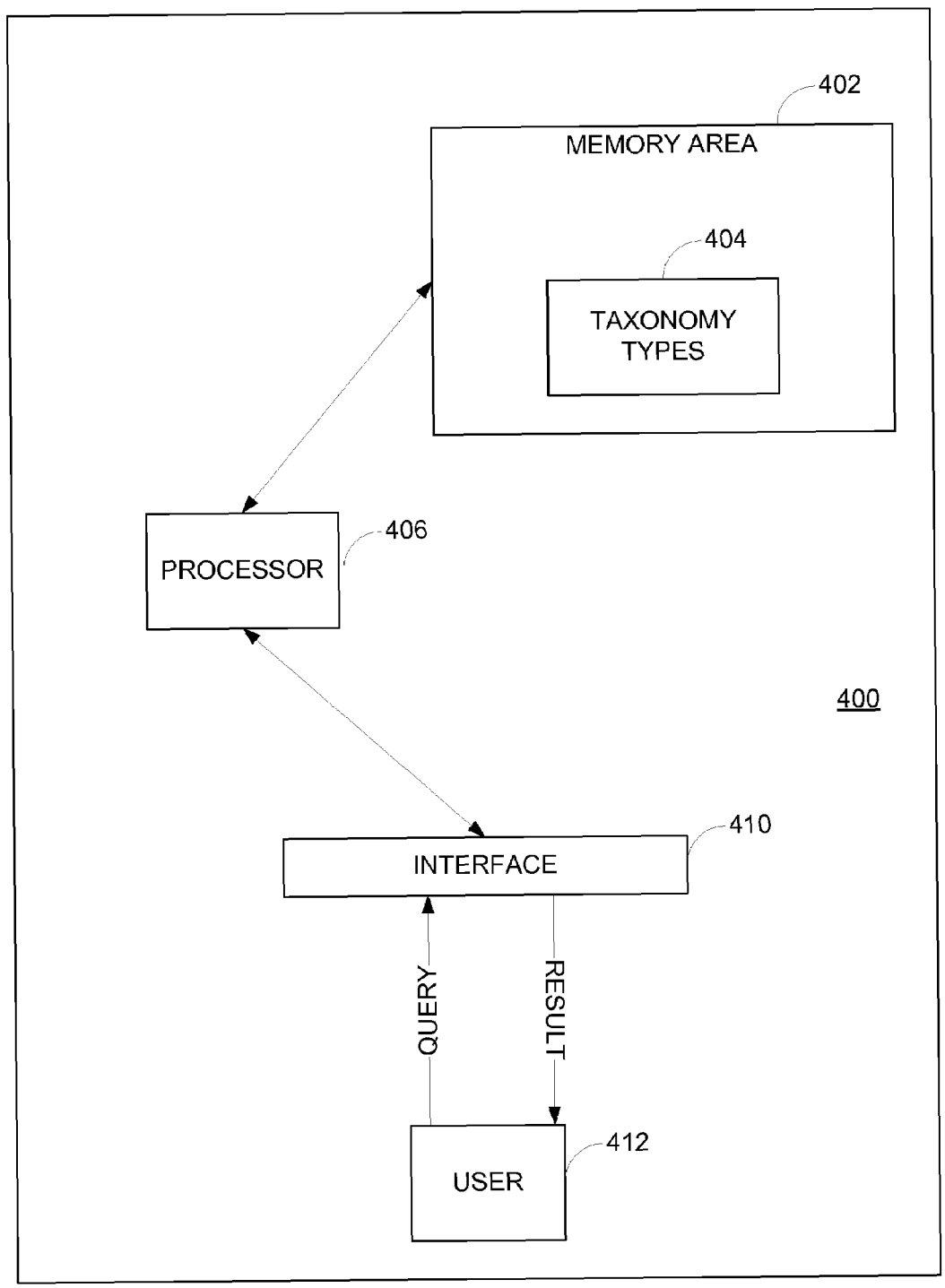
FIG. 4 is a block diagram illustrating a system for using the taxonomy structure according to an embodiment of the invention.

FIG. 4 is a block diagram illustrating a system 400 for using the taxonomy structure according to an embodiment of the invention. In one embodiment, FIG. 4 is employed to illustrate the single instance example of embodiments of the invention. The system 400 includes a memory area 402 for storing data associated with a plurality of taxonomy types 404 (e.g., taxonomy types 202 in FIG. 2A). A processor 404 is configured to execute computer-executable instructions for defining the plurality of taxonomy types. The processor 406 classifies an object according to at least one of the taxonomy types based on the relationship of the classified object to one or more other objects related thereto.

The processor 406 also stores information associated with the classified object in the memory area. A first reference is associated with the taxonomy type of the classified object and the first reference identifies an actual entity represented by the classified object. The processor 404 also generates a first data set (e.g., data included in the definition tag 210) in the taxonomy type of the classified object. The first data set identifies a set of the one or more related objects positioned higher in a hierarchical structure than the classified object. The processor 406 generates a second data set in the taxonomy type of the classified object, and the second data set identifies a set of the one or more related objects positioned lower in the hierarchical structure than the classified object.

In another embodiment, the system 400 includes an interface 410 for creating a single instance of the taxonomy type of the classified object including the information of the classified object and the information represented in the first data set and the second data set. In this example, a user 412 enters a query for traversing the taxonomy to retrieve information associated with the classified objects. In processing the query, the processor 406 identifies information in response to the query by identifying the classified object in the taxonomy type and the first data set and the data set in the taxonomy type (e.g., instead of traversing the entire structure as shown in FIG. 1 at 108). Because the first data set (represented by the third data field 310) and the second data set (represented by the fourth data field 312) already identify the set of objects positioned higher and lower, respectively, in the hierarchical structure, embodiments of the invention eliminate the need to traverse completely to the end of the structure to respond to the query.

Figure 6:
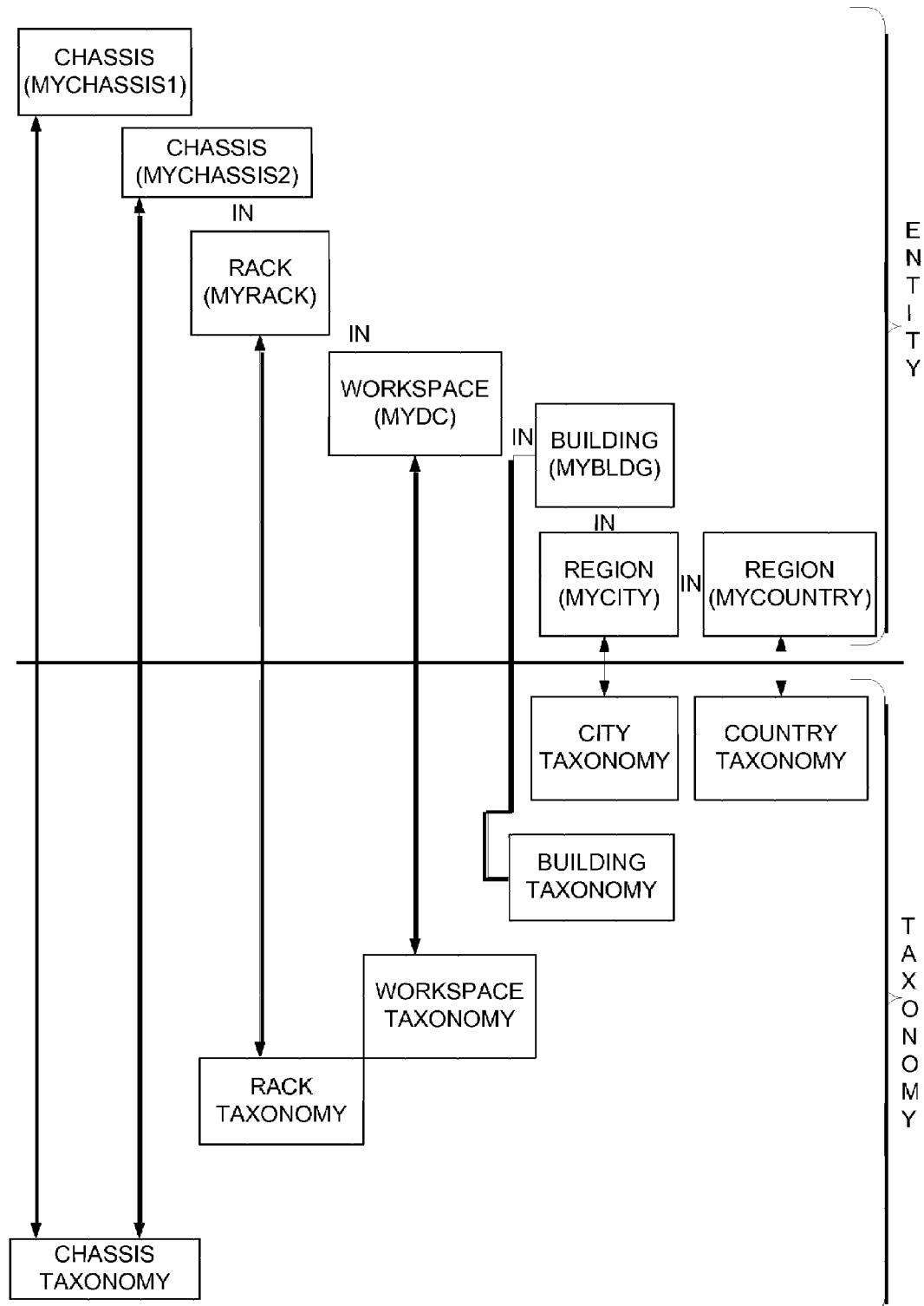
FIG. 6 is a block diagram illustrating a specific implementation of a containment taxonomy according to an embodiment of the invention.

In another embodiment, similar constructs may be defined to store and navigate terminology taxonomies (for example, defining a status, sub-status, symptom hierarchy). Regardless of a terminology taxonomy or a containment taxonomy, embodiments of the invention define a framework that is useful in other instances, such as file structure representations, business entity representations, business model classifications, or other classification implementations. As described above, aspects of the invention provide a mechanism for tying the "real world" data (as illustrated in FIG. 6 within the "entity" bracket). In one example, UML classes or XML schema types are used to associate the "real world" data or entity with the taxonomy type, and embodiments of the invention optimize retrieval of the taxonomy type and the taxonomy hierarchy in a single instance retrieval. In addition, alternative embodiments of the invention are flexible to enable extension by partners or customers using the same structure illustrated in FIGS. 2A and 3A. For example, based on the taxonomy types defined for the partners or customers, embodiments of the invention can properly represent all relevant data, such as all hardware vendors may extend the implementation of the hardware taxonomy types to cover their internal inventory systems by classifying objects based on the framework described above.

Furthermore, embodiments overcome one of the implementation problems involved in referencing related objects in a hierarchical structure. For example, taxonomies are typically described in UML or XML schema using direct references to an immediate parent and sometimes, to child references. This is done, for example, where a computer contains its devices, and a device references its containing computer. However, this approach is inefficient—since a programmer has to de-reference or modify the reference of the immediate parent, determine the data item that holds the parent's "parent" (if one is defined at all) and then de-reference to get the parent's parent data, ad infinitum.

Figure 5:
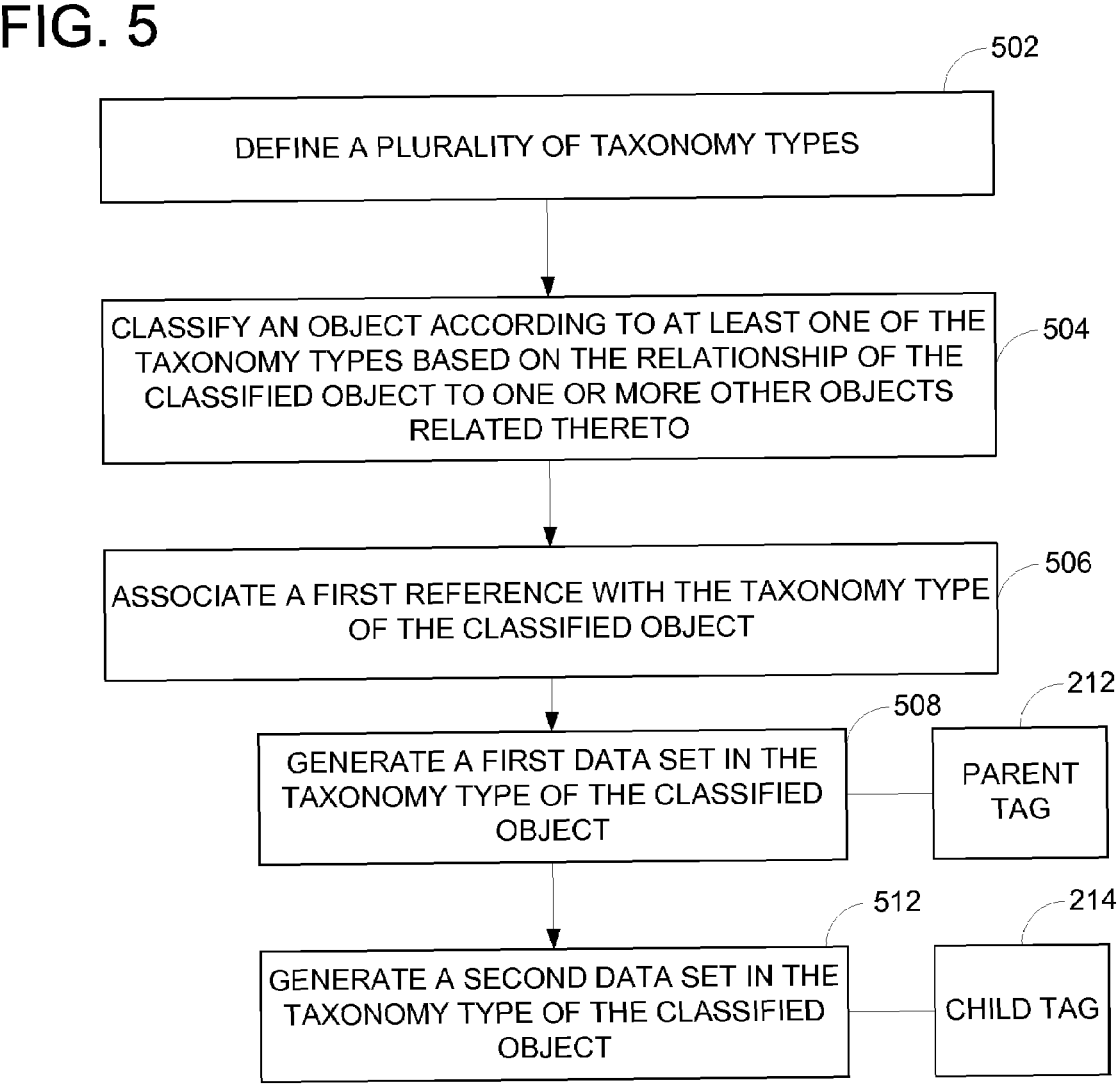
FIG. 5 is a flow chart illustrating operations of representing a plurality of objects to form a taxonomy structure according to an embodiment of the invention.

Referring now to FIG. 5, a flow chart illustrates exemplary operations of representing a plurality of objects to form a taxonomy structure according to an embodiment of the invention. At 502, a plurality of taxonomy types is defined within a taxonomy. The taxonomy classifies the plurality of taxonomy types to represent the plurality of objects. At 504, an object is classified according to at least one of the taxonomy types based on the relationship of the classified object to one or more other objects related thereto. A first reference is associated with the taxonomy type of the classified object and this first reference identifies an actual entity represented by the classified object at 506. A first data set in the taxonomy type of the classified object is generated, and the first data set identifies a set of the one or more related objects positioned higher in a hierarchical structure than the classified object at 508. For example, the parent tag 210 may include the generated first data set. At 512, a second data set in the taxonomy type of the classified object is generated, and the second data set identifies a set of the one or more related objects positioned lower in the hierarchical structure than the classified object.

In operation, embodiments of the invention may be implemented as shown in FIG. 6 and described below. FIG. 6 illustrates an exemplary physical containment environment, such as a chassis in a rack in a data center. The physical containment example is as follows: A company would like to track the explicit location of its chassis in racks in data centers in buildings in regions (going up to a multi-national region definition). The XML Schema definition embodying aspects of the invention provides the details of each of the business/mgmt entities:

1. Chassis—Serial number, number of slots available/used, any warranty data,
2. Rack—Serial number, number of locations available/used, contacts,
3. Data center—Name, status, contacts, . . .
4. Building—Name, floor plans, . . .
5. Region—Name (e.g., city or country name)
6. Plus there is a taxonomy instance Each of the business or management entities includes a reference to its taxonomy instance or type. And the taxonomy instance or type references back to the business or management entities, and all parents/children, such as shown in FIG. 6. For example, a "MyChassis1" is an entity, which is referenced back to a "Chassis" taxonomy type.

In one embodiment, the specific taxonomy instance for "MyRack" includes the following data:
1. Reference to the Rack instance, "MyRack"
2. Ordered parents (e.g., first data set):
  (a). a reference to Region, "MyCountry", and the Taxonomy instance for "MyCountry"
  (b). a reference to Region, "MyCity", and the Taxonomy instance for "MyCity"
  (c). a reference to Building, "MyBldg", and the Taxonomy instance for "MyBldg"

(d). a reference to Workspace, "MyDC", and the Taxonomy instance for "MyDC"

3. Children (e.g., second data set)

(a). a reference to Chassis, "MyChassis1", and the Taxonomy instance for "MyChassis1."

(b). a reference to Chassis, "MyChassis2", and the Taxonomy instance for "MyChassis2."

So, with one reference traversal from the entity to its taxonomy, all information for parents and children is available.

Alternative embodiments of the invention are optimized if an XML processing infrastructure natively understands and participates in supporting "taxonomies". For example, one mechanism may support alternate names or alternative containment paths for an instance. In this way, the "real world" instance or entity would not have to reference a specific taxonomy instance—but would instead define alternate names/paths that specify the containment hierarchy. One example includes a convention for naming of the instances would be required in order to have full functionality. For example, the alternative name or alternative containment paths for "COM1" in FIG. 2A may be "DSL card."

Using FIG. 6 as an example, a "naming convention" using XML enables an easy retrieval of parent/peer data is to deconstruct the name/path to create the substring preceding the last "/" and add the ".xml" string suffix to obtain the parent reference, or the "/ . . . " suffix to obtain all peers. For example, the name of the parent rack for MyChassis1 is "MyCountry/MyCity/MyBldg/MyRack/MyChassis1.xml"–"/MyChassis1.xml"="MyCountry/MyCity/MyBldg/MyRack.xml". And, all peers could be retrieved by searching against "MyCountry/MyCity/MyBldg/MyRack/ . . . " All children of the chassis could be retrieved by querying for "MyCountry/MyCity/MyBldg/MyRack/MyChassis1/ . . . "

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method for representing a plurality of objects, said computerized method comprising:

defining a plurality of taxonomy types within a taxonomy having a hierarchical structure, said taxonomy defining an all-inclusive structure for classifying the plurality of taxonomy types to represent the plurality of objects with corresponding associations;

classifying an object according to at least one of the taxonomy types based on the relationship of the classified object to one or more other objects related thereto;

associating a first reference with the taxonomy type of the classified object, said first reference identifying an actual entity represented by the classified object;

generating, by a processor of a computing device, a first data set integrated into the taxonomy type of the classified object in the same hierarchical level as the taxonomy type in the hierarchical structure, said first data set being a first tag of the classified object and identifying a set of the one or more related objects positioned higher in the hierarchical structure than the classified object;

generating, by the processor of the computing device, a second data set integrated into the taxonomy type of the classified object in the same hierarchical level as the taxonomy type in the hierarchical structure, said second data set being a second tag of the classified object and identifying a set of the one or more related objects positioned lower in the hierarchical structure than the classified object; and providing the all-inclusive structure to a user for accessing the plurality of objects.

2. The computerized method of claim 1, further comprising providing information of the classified object and information of the first data set and the second data set in the taxonomy type of the classified object in response to a query from a user.

3. The computerized method of claim 2, wherein providing information comprises instantiating a single instance of the taxonomy type of the classified object including the information of the classified object and the information represented in the first data set and the second data set.

4. The computerized method of claim 1, wherein the first data set comprises one or more data fields and wherein generating the first data set comprises storing information associated with each of the set of the one or more related objects positioned higher in the hierarchical structure than the classified object in the data fields.

5. The computerized method of claim 1, wherein the second data set comprises one or more data fields and wherein generating the second data set comprises storing information associated with each of the set of the one or more related objects positioned lower in the hierarchical structure than the classified object in the data fields.

6. The computerized method of claim 1, wherein generating the first data set comprises storing a reference in the taxonomy type of the classified object for identifying each of the set of the one or more related objects positioned higher in the hierarchical structure than the classified object.

7. The computerized method of claim 1, wherein generating the second data set comprises storing a reference in the taxonomy type of the classified object for identifying each of the set of the one or more related objects positioned lower in the hierarchical structure than the classified object.

8. The computerized method of claim 1, wherein one or more computer-readable media have computer-executable instructions for performing the computerized method of claim 1.

9. A system for representing a plurality of objects, said system comprising:
a memory area for storing data associated with a plurality of taxonomy types having a hierarchical structure; and
a processor configured to execute computer-executable instructions for:
defining the plurality of taxonomy types;
classifying an object according to at least one of the taxonomy types based on the relationship of the classified object to one or more other objects related thereto;
storing information associated with the classified object in the memory area;
associating a first reference with the taxonomy type of the classified object, said first reference identifying an actual entity represented by the classified object;
generating a first data set integrated into the taxonomy type of the classified object in the same hierarchical level as the taxonomy type in the hierarchical structure, said first data set identifying a set of the one or more related objects positioned higher in the hierarchical structure than the classified object; and
generating a second data set integrated into the taxonomy type of the classified object in the same hierarchical level as the taxonomy type in the hierarchical structure, said second data set identifying a set of the one or more related objects positioned lower in the hierarchical structure than the classified objects; and
providing the all-inclusive structure to a user for accessing the plurality of objects.

10. The system of claim 9, further comprising an interface for creating a single instance of the taxonomy type of the classified object including the information of the classified object and the information represented in the first data set and the second data set.

11. The system of claim 10, wherein the interface is configured to provide information of the classified object and information represented in the first data set and the second data set in one instance.

12. The system of claim 9, wherein the first data set comprises an ordered list.

13. The system of claim 9, wherein the second data set comprises one or more data fields for storing information associated with each of the set of the one or more related objects positioned lower in the hierarchical structure than the classified object.

14. The system of claim 9, wherein the first data set comprises a reference for identifying each of the set of the one or more related objects positioned higher in the hierarchical structure than the classified object, and wherein the second data set comprises a reference for identifying each of the set of the one or more related objects positioned lower in the hierarchical structure than the classified object.

15. The system of claim 9, wherein the processor is configured to define the plurality of taxonomy types in a hardware taxonomy structure, wherein the first data set identifies the set of the one or more related objects positioned higher in the hardware taxonomy structure than the classified object, and wherein the second data set identifies the set of the one or more related objects positioned lower in the hardware taxonomy structure than the classified object.

* * * * *